(12) United States Patent
Blanchard et al.

(10) Patent No.: US 8,349,129 B2
(45) Date of Patent: Jan. 8, 2013

(54) METHOD AND APPARATUS FOR DEBONDING A SUBMOUNTED SUBSTRATE

(75) Inventors: Robert Blanchard, Mesa, AZ (US); R. Steve Rednour, Chandler, AZ (US); Douglas Loy, Chandler, AZ (US)

(73) Assignee: Arizona Board of Regents, a body corporate of the State of Arizona acting for and on behalf of Arizona State University, Scottsdale, AZ (US)

( * ) Notice: Subject to any disclaimer, the term of this patent is extended or adjusted under 35 U.S.C. 154(b) by 344 days.

(21) Appl. No.: 12/921,871

(22) PCT Filed: Mar. 25, 2009

(86) PCT No.: PCT/US2009/038275
§ 371 (c)(1),
(2), (4) Date: Oct. 13, 2010

(87) PCT Pub. No.: WO2009/126443
PCT Pub. Date: Oct. 15, 2009

(65) Prior Publication Data
US 2011/0023672 A1 Feb. 3, 2011

Related U.S. Application Data

(60) Provisional application No. 61/044,278, filed on Apr. 11, 2008.

(51) Int. Cl.
*B29C 63/00* (2006.01)
*B32B 38/10* (2006.01)

(52) U.S. Cl. ........ 156/717; 156/707; 156/758; 156/761; 156/762; 700/114; 700/121; 700/160; 700/169; 700/170

(58) Field of Classification Search .............. None
See application file for complete search history.

(56) References Cited

U.S. PATENT DOCUMENTS

| | | | | |
|---|---|---|---|---|
| 5,064,130 A | * | 11/1991 | Blaimschein et al. | 242/419.4 |
| 5,425,834 A | * | 6/1995 | Shinohara et al. | 156/360 |
| 6,139,676 A | | 10/2000 | Fernandez et al. | |
| 7,150,804 B2 | * | 12/2006 | Tajima | 156/718 |
| 7,713,368 B2 | * | 5/2010 | Yoshioka et al. | 156/247 |
| 7,846,288 B2 | * | 12/2010 | Larson et al. | 156/247 |
| 2008/0236743 A1 | | 10/2008 | Myeong-Ha et al. | |
| 2008/0245483 A1 | | 10/2008 | Takeshi et al. | |

FOREIGN PATENT DOCUMENTS

| | | |
|---|---|---|
| DE | 19720845 | 11/1998 |
| EP | 1714782 | 10/2006 |
| WO | 2004082938 | 9/2004 |

* cited by examiner

*Primary Examiner* — Mark A Osele
*Assistant Examiner* — Nickolas Harm
(74) *Attorney, Agent, or Firm* — McDonell Boehnen Hulbert & Berghoff LLP

(57) ABSTRACT

The present invention provides a debonding apparatus, a system comprising such apparatus, and methods for using such apparatus or system for the removal of flexible substrates (14) post-processing without damage to fabricated devices.

29 Claims, 1 Drawing Sheet

METHOD AND APPARATUS FOR DEBONDING A SUBMOUNTED SUBSTRATE

RELATED APPLICATIONS

This application claims priority to U.S. Provisional Application Ser. No. 61/044,278 filed Apr. 11, 2008, incorporated by reference herein in its entirety.

STATEMENT OF GOVERNMENT FUNDING

This work was supported at least in part by U.S. Army Research Labs (ARL) Grant No. W911NF-04-2-005. The U.S. Government has certain rights in this invention.

BACKGROUND OF THE INVENTION

Flexible displays and electronics are poised to revolutionize the industry with low cost, rugged, and/or disposable applications. The proliferation of flexible displays and electronics are inhibited in part by ancillary technologies that facilitate their fabrication. In order for circuitry to be fabricated on flexible substrates, the substrates themselves need to be secured in a fixed orientation during processing. Some have used framing or bonding while others have envisioned roll-to-roll types of processing. While roll-to-roll is promising in theory, the practical application of roll-to-roll to high resolution semiconductor-like processes has yet to be demonstrated on a significant scale. Framing has been demonstrated to be impractical at a large scale, and would require much equipment and process modifications to become a viable option. While bonding technologies exist and are currently implemented at manufacturing scales, these processes have for the most part been limited to rigid-to-rigid bonding.

Another approach is bonding flexible substrates to rigid carriers, involving development of a bonding process with an adhesive amenable to semiconductor processes. This approach renders subsequent debonding even more challenging, since the flexible substrate must be separated from the rigid carrier without damaging the fabricated circuitry or the flexible substrate itself.

SUMMARY OF THE INVENTION

The discovery presented herein outlines a method and tool platform for accomplishing removal of flexible substrates post-processing without damage to the fabricated devices. In addition the method does not induce damage to the rigid carrier, which can then be reclaimed and reused to foster the sustainability of this manufacturing process.

Thus, in a first aspect, the present invention provides an apparatus for debonding a submounted substrate comprising: (a) an X-stage, (b) a vacuum operated chuck attached to the X-stage, wherein the vacuum operated chuck is capable of receiving a submounted substrate, (c) a Y-stage moveably coupled to the X-stage and oriented perpendicular to the X-stage, and (d) a debonder coupled to the Y-stage, wherein the debonder comprises two mounting blocks and a cutting edge, wherein the two mounting blocks each have a distal end attached to the Y-stage such that the X-stage is capable of moving between the two mounting blocks, wherein the two mounting blocks each have a proximal end attached to an end of the cutting edge such that the cutting edge spans the X-stage, wherein the cutting edge is adjustable in height in a Z-axis.

The present invention also provides a method for debonding a submounted substrate comprising: (a) mounting a submounted substrate in a vacuum operated chuck attached to an X-stage, wherein the submounted substrate comprises a rigid carrier substrate bonded to a flexible substrate, wherein the X-stage is moveably coupled to a Y-stage, (b) adjusting a debonder's height in a Z-axis such that the debonder is aligned with an interface between the rigid carrier substrate and the flexible substrate, wherein the debonder is coupled to the Y-stage, wherein the debonder comprises two mounting blocks and a cutting edge, wherein the two mounting blocks each have a distal end attached to the Y-stage such that the X-stage is capable of moving between the two mounting blocks, wherein the two mounting blocks each have a proximal end attached to an end of the cutting edge such that the cutting edge spans the X stage, (c) bringing an upper plate comprising a vacuum-ring into contact with the flexible substrate, and (d) debonding the flexible substrate from the rigid carrier substrate such that the debonder cuts through the interface between the rigid carrier substrate and the flexible substrate, wherein the vacuum-ring holds onto the flexible substrate via suction as the flexible substrate is debonded from the rigid carrier.

The present invention also provides a system for debonding a submounted substrate comprising: (a) a user interface, (b) a conveyor system communicatively coupled to the user interface, wherein the conveyor system is operable to (i) transport a submounted substrate a predetermined distance and (ii) load the submounted substrate into a debonding apparatus, (c) a solvent drip system communicatively coupled to the user interface, wherein the solvent drip system is operable to apply a solvent drip to the submounted substrate, (d) a vibration system communicatively coupled to the user interface, wherein the vibration system is operable to vibrate a debonder at ultrasonic frequencies, (e) a vacuum system communicatively coupled to the user interface, wherein the vacuum system is operable to stabilize the submounted substrate against an upper plate via a vacuum-ring, (f) a debonding system communicatively coupled to the user interface, wherein the debonding system is operable to separate the submounted substrate into a flexible substrate and a rigid carrier substrate, (g) a temperature control system communicatively coupled to the user interface, wherein the temperature control system is operable to heat the debonding system's cutting edge and/or vacuum operated chuck prior to debonding, (h) a reel to reel system optionally communicatively coupled to the user interface, wherein the debonder is capable of replacing the cutting edge after use, and (i) a cleaning system communicatively coupled to the user interface, wherein the cleaning system is operable to remove residual adhesive from the rigid carrier substrate after debonding.

In another aspect, the invention supplies physical computer readable storage media providing instructions stored in data storage and executable by a processor for causing a system for debonding a submounted substrate to carry out any one or more of the methods of the invention. The physical computer readable storage media is capable of operating on a computer system to control various embodiments of a system for debonding a submounted substrate.

One embodiment of the above aspect is physical computer readable storage media providing instructions stored in data storage and executable by a processor for causing a system for debonding a submounted substrate to carry out functions including: (a) transporting a submounted substrate for a predetermined distance, (b) loading a submounted substrate into a debonding apparatus; (c) applying a solvent drip to the submounted substrate, (d) heating a cutting edge and/or a vacuum operated chuck, (e) vibrating a debonder at ultrasonic frequencies, (f) stabilizing the submounted substrate against an upper plate via a vacuum-ring, (g) debonding the submounted substrate, (h) replacing the debonder's cutting edge via a reel-to-reel system, and (i) removing residual adhesive from the submounted substrate's rigid carrier substrate after debonding.

DETAILED DESCRIPTION OF THE INVENTION

In a first aspect, the present invention may take the form of an apparatus for debonding a submounted substrate comprising: (a) an X-stage, (b) a vacuum operated chuck attached to the X-stage, wherein the vacuum operated chuck is capable of receiving a submounted substrate, (c) a Y-stage moveably coupled to the X-stage and oriented perpendicular to the X-stage, and (d) a debonder coupled to the Y-stage, wherein the debonder comprises two mounting blocks and a cutting edge, wherein the two mounting blocks each have a distal end attached to the Y-stage such that the X-stage is capable of moving between the two mounting blocks, wherein the two mounting blocks each have a proximal end attached to an end of the cutting edge such that the cutting edge spans the X-stage, wherein the cutting edge is adjustable in height in a Z-axis.

Figure 2:
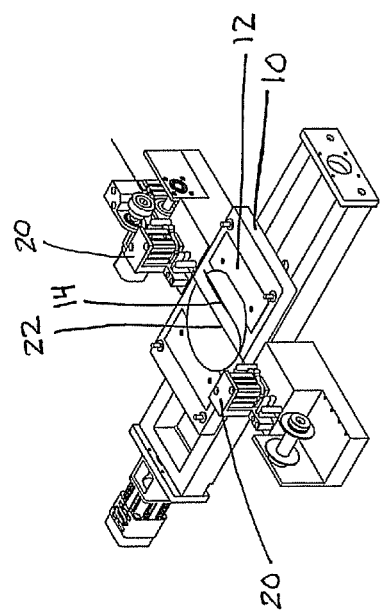
FIG. 2 is a isometric view of the apparatus.
Figure 4:
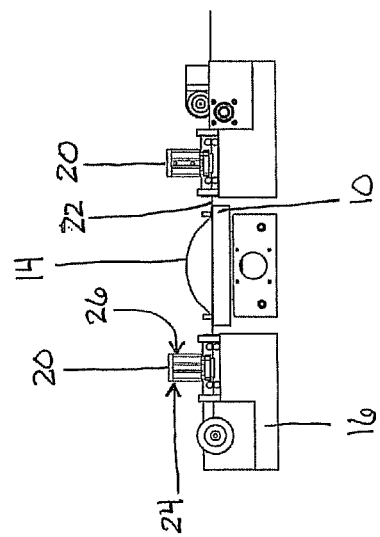
FIG. 4 is a side view of the apparatus.
Figure 1:
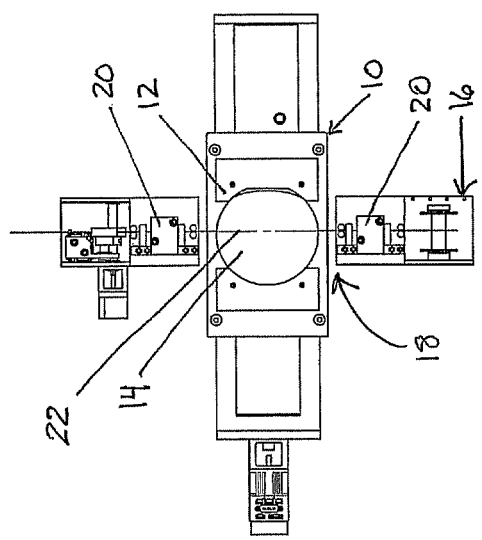
FIG. 1 is a top view of the apparatus.
Figure 3:
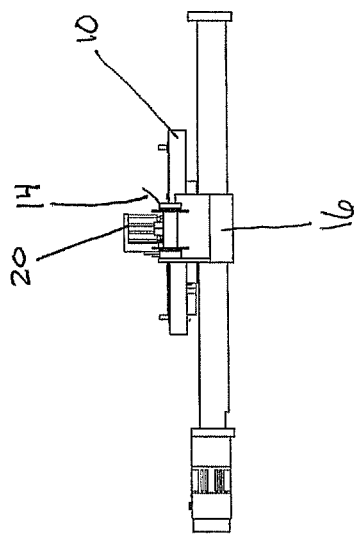
FIG. 3 is a front view of the apparatus.

Exemplary embodiments of the apparatus are provided in FIGS. 1-4. Component numbers recited below refer to FIGS. 1-4, and are provided for purposes of illustration only, and not to limit the claimed invention to the pictured embodiments.

As used herein, a "flexible substrate" is a free-standing substrate comprising a flexible material which is capable of being flexed, distorted, twisted, bent or conformed. Non-limiting examples of flexible substrates include, but are not limited to films of metals and polymers, e.g. metal foils, such as aluminum and thin metal foils, and polymeric sheets, such as polyimides, polyethylene, polycarbonates, polyethylene terephthalate (PET), polyethylene naphthalate (PEN), polyethersulfone (PES), and multi-layer stacks comprising two or more metal and/or polymeric materials provided the entire stack assembly remains flexible. The flexible substrates may be of any thickness suitable for a given purpose, with preferred thicknesses being application specific. In various embodiments, the flexible substrates range from 10 um to 5 mm in thickness.

As used herein, the rigid carrier may comprise any material that is capable of withstanding the processing used to fabricate electronic components or circuits. In one embodiment, the rigid carrier comprises a semiconducting material. In other preferred aspects and embodiments, the rigid carrier preferably has at least one substantially flat surface. More preferably, the rigid carrier is a semiconductor wafer. Even more preferably, the rigid carrier is a silicon wafer (preferably, with a flat surface).

As used herein, the X-stage 10 is a platform oriented along an X-axis that provides a surface to support the vacuum operated chuck 12.

As used herein, the vacuum operated chuck 12 is any type of vacuum operated chuck 12 known in the art. The surface of the chuck presented to the user contains one or more holes or channels through which vacuum suction is applied to the surface of the rigid carrier substrate of the submounted substrate 14 to hold the rigid carrier substantially in place during the debonding process.

As used herein, the Y-stage 16 is a platform oriented substantially perpendicular to the X-stage 10 along a Y-axis that provides one or more surfaces in one or more planes along a Z-axis to support the X-stage 10 and the debonder 18. The Y-stage 16 is moveably coupled to the X-stage 10 such that the X-stage 10 may be manually moved back-and-forth along the X-axis.

In one embodiment, the Y-stage 16 is capable of movement. The movement of the Y-stage 16 allows the debonder 18 coupled to the Y-stage 16 to produce a back-and-forth saw-like movement through the adhesive layer of the submounted substrate 14, thereby aiding in the debonding process.

In one embodiment, the Y-stage 16 is capable of rotational movement concentric to the X-stage 10. Beginning in a perpendicular orientation to the X-axis, the Y-stage 16 could, at a minimum, rotate 45 degrees clockwise and 45 degrees counterclockwise for a total of 90 degrees. And, at a maximum, where the length of the debonder's cutting edge 22 is greater than the length of the X-stage 10 along the X-axis, the Y-stage 16 could rotate 360 degrees.

In all embodiments disclosed herein, the X-stage 10 and Y-stage 16 may also be motorized.

In one embodiment, the debonder's cutting edge 22 is positioned substantially inline with an adhesive layer between the rigid carrier substrate and the flexible substrate. Any technique for adjusting the height of the cutting edge 22 may be used, including but not limited to, embodiments in which the mounting blocks 20 may, for example, be capable of (i) telescoping and locking in place, (ii) the mounting blocks 20 may contain two detents on opposing faces that are movable within two corresponding notched tracks, and/or (iii) the surface that the debonder 18 is attached to and may be moveable relative to the Y-stage 16 along the Z-axis. Alternatively, there may be a plurality of mounting blocks 20 of various heights, which correspond to different thicknesses of submounted substrates 14 that may be used interchangeably according to the application. In a further alternative, the chuck 12 may be adjusted up or down to ensure that the cutting edge 22 is pushed slightly by the chuck 12.

One of skill in the art will understand, based on the teachings herein, that there are many ways to adjust the height of the cutting edge 22. Further, the cutting edge 22 comprises a material capable of overcoming the strength of the adhesive as the cutting edge 22 is advanced through the adhesive layer. For example, any high tensile strength material can be used, including but not limited to a high tensile strength wire or cord.

In one embodiment, the cutting edge 22 of the debonder 18 is replaced after use in the debonding process via a reel-to-reel system. As used herein, a reel-to-reel system comprises a spool of thin wire that unwinds and feeds the wire from the proximal end 26 of one of the debonder's mounting blocks 20 to the proximal end 26 of the other mounting block and from there onto a spool which receives and winds the used cutting edge 22. The reel-to-reel system is also operable with a thin razorblade-type material capable of winding. The reel-to-reel system may be operated manually, for example, by winding the receiving spool directly by hand or with a hand crank, or may be motorized to pull through the next length of wire or razorblade-type material; in this embodiment it may be communicatively coupled to the user interface.

In one embodiment, the apparatus may further comprise an upper plate comprising a vacuum-ring, wherein the upper plate's vacuum source is coupled to the X- or Y-stage 16. In one embodiment, the upper plate's vacuum-ring may comprise a plurality (2, 3, 4, 5, 6, or more) pliable vacuum tips of a desirable diameter, for example 1/16", arranged as desired, for example in a circle of 6 inches in diameter, and operates at a pressure in the range of approximately −10 to −50 mm Hg. One of ordinary skill in the art, however, will appreciate that there are many different configurations for a vacuum-ring that will serve the same purpose and each dimension and configuration will depend upon the size and shape of the flexible substrate being debonded. For example, the vacuum ring could comprise (i) a single hole with a diameter larger than 1/16" in the middle of the upper plate, (ii) a plurality of holes less than 1/16" in diameter arranged in one or more clusters, or (iii) one or more channels of various lengths and widths.

In operation, the upper plate is brought into contact with the flexible substrate prior to debonding and vacuum suction is initiated. The upper plate's vacuum-ring holds onto the flexible substrate as it is debonded from the rigid carrier to prevent the carrier from reattaching once debonded, as well as to substantially limit curl in the edges of the flexible substrate. The upper plate may be aligned manually such that the upper plate is attached to one or more male components that pair with one or more female components, for example, alignment pins attached to the upper plate that mate with holes recessed in the vacuum chuck 12. Alternatively, the alignment of the upper plate may be automated, for example, a robotic arm may be calibrated to move the upper plate into proper position or a housing may be fixed relative to the X- and Y-stage 16 to lower the upper plate into position. One of ordinary skill in the art will understand, based on the teachings herein, that there are many ways in which proper alignment of the upper plate can be achieved.

In one embodiment, the apparatus may further comprise means for controlling temperature of the debonder's cutting edge 22. When the heated cutting edge 22 is brought into contact with the adhesive layer, the adhesive softens and is more pliable, making it easier to debond the submounted substrate 14. The heating element may be coupled to one or both of the debonder's mounting blocks 20, which transfers the heat to the cutting edge 22 via direct contact. Alternatively, the feeding spool of the reel-to-reel system may contain a heating coil that transfers the heat to the cutting edge 22 prior to unwinding for active use in the debonding process. In another embodiment in which air cylinders are used to clamp down on the cutting edge 22, the cutting edge 22 can be sandwiched between 2 aluminum plates, and the cutting edge 22 can be heated via electrical contacts made through these aluminum plates. In one embodiment, the means for controlling temperature is a temperature controller.

In another embodiment, the apparatus further comprises a temperature controller functionally coupled to the debonder cutting edge 22.

In one embodiment, the apparatus may further comprise means for vibrating the debonder 18 at ultrasonic frequencies. The means for vibrating the debonder 18 may comprise a transducer plate, for example, or any other type of ultrasonic vibration inducing mechanism known in the art. The vibrating means are coupled to both mounting blocks 20 such that the vibration of the debonder 18 further assists the cutting edge 22 in penetrating through the adhesive layer of the submounted substrate 14. In one embodiment, the cutting edge 22 of the debonder 18 is capable of being vibrated at ultrasonic frequencies. To accomplish this, the means may comprise one or more transducer plates that may lay across the top of one or both mounting blocks 20 of the debonder 18 underneath and in direct contact with the cutting edge 22. As the transducer plates vibrate, those vibrations are then transferred to the cutting edge 22 of the debonder 18. The vibration of the cutting edge 22 further assists in penetrating through the adhesive layer of the submounted substrate 14.

In another embodiment, the apparatus further comprises one or more transducer plates functionally coupled to the debonder 18.

In one embodiment, the apparatus may further comprise means for applying a solvent to the submounted substrate 14, wherein the means for applying the solvent includes a solvent reservoir coupled to either the X- or Y-stage 16. The application of the solvent dissolves the adhesive layer at the perimeter of the submounted substrate 14 weakening the bond between the rigid carrier substrate and the flexible substrate making it easier for the cutting edge 22 to penetrate the adhesive layer.

In one embodiment, the means for applying the solvent comprises a solvent drip system. As used herein, the solvent drip system may comprise a spray mechanism that directs a solvent spray at the adhesive layer around the perimeter of the submounted substrate 14. As used herein, the spray can have many different forms. By way of example, the spray may comprise (i) a mist of fine particles of solvent discharged from an atomizer or other device, (ii) a high powered jet or stream of solvent in which the particles are more closely concentrated than a mist, or (iii) droplets of a size similar to that administered by a medicine dropper. The solvent drip system may also comprise a saturated element that is saturated with solvent and brought into direct contact with the perimeter of the adhesive layer for a predetermined amount of time. The saturated element could comprise a sponge, or any other type of absorbent material commonly known in the art that is characterized by readily absorbing liquids and becoming soft when wet while retaining toughness. The saturated element may remain saturated via a solvent reservoir in direct contact with the saturated element or the saturated element could be dipped in solvent prior to application to the adhesive layer. Further, the solvent drip system may apply the solvent both prior to and during the debonding process.

In a further embodiment, the apparatus further comprises a solvent drip system coupled to one or both of the X- or Y-stage 10, 16.

In one embodiment, the apparatus may further comprise a cleaning system for removing residual adhesive from a rigid carrier substrate after debonding occurs, wherein the cleaning system includes a solvent reservoir coupled to one or both of the X- or Y-stage 10, 16. As used herein, a cleaning system for removing residual adhesive from a debonded rigid carrier substrate or flexible substrate is a system that results in removing substantially all residual adhesive without inflicting damage on the substrates themselves.

As used herein, residual adhesive refers to that portion of the adhesive layer that remains adhered to either the rigid carrier substrate or flexible substrate after the debonding process is complete.

In one embodiment, the cleaning system for removing residual adhesive from a rigid carrier comprises a means for batch dip in solvent. As herein used, a batch dip requires that a rigid carrier substrate or a flexible substrate be completely immersed in solvent or, alternatively, that only the side with residual adhesive present be immersed in solvent. In this embodiment the reservoir containing solvent in which the respective substrates are dipped is coupled to one or both of the X- or Y-stage 10, 16.

In one embodiment, the apparatus may further comprise a cleaning system for removing residual adhesive from a flexible substrate after debonding occurs, wherein the cleaning system includes a solvent reservoir coupled to one or both of the X- or Y-stage 10, 16.

In one embodiment, the cleaning system for removing residual adhesive from a flexible substrate comprises a high pressure solvent spray. As herein used, a high pressure solvent spray is applied to the rigid carrier substrate or flexible substrate using a high pressure spray substantially directed only to the side with residual adhesive present. The high pressure solvent spray first dissolves the residual adhesive and then the pressure of the spray washes the adhesive away. In this embodiment the reservoir containing solvent from which the high pressure spray is drawn is coupled to one or both of the X- or Y-stage 10, 16.

In one embodiment, the apparatus may further comprise a conveyor system for loading a submounted substrate 14 into the vacuum operated chuck 12, wherein the conveyor system is coupled to the X-stage 10. As used herein, the conveyor system may comprise a slide that is substantially rigidly attached to a stationary portion of a conveyor belt at the slide's distal end, whereas the slide's proximal end is moveably coupled to the X-stage 10 such that the slide is positioned adjacent to the vacuum chuck 12. The conveyor belt is of a type commonly known in the art and carries the submounted substrate 14 from a remote location to the slide. As the submounted substrate 14 reaches the end of the conveyor belt, the submounted substrate 14 is propelled onto the slide and slides into a depression in the vacuum chuck 12, which is sized to accommodate the submounted substrate 14 or, alternatively, slides until it hits a stop on the vacuum chuck 12.

The conveyor system may also comprise a robotic arm with a base that is substantially rigidly attached to a stationary portion of a conveyor belt and that is moveably coupled to the X-stage 10. The robotic arm has a range of motion that can accommodate removal of the submounted substrate 14 from the conveyor belt and placement of the submounted substrate 14 on the vacuum chuck 12. The conveyor belt is of a type commonly known in the art and carries the submounted substrate 14 from a remote location to the robotic arm. As the submounted substrate 14 is brought within reach of the robotic arm, the arm lifts the submounted substrate 14 off the conveyor belt and places the substrate 14 onto the vacuum chuck 12

The conveyor system may additionally comprise a conveyor belt where the stationary portion of the conveyor belt is moveably coupled to the X-stage 10 such that the conveyor belt is substantially adjacent to the vacuum chuck 12. The conveyor belt is of a type commonly known in the art and carries the submounted substrate 14 from a remote location to the vacuum chuck 12. The conveyor belt further includes a flexible protrusion oriented at an acute angle in the direction of movement and at a set distance from the rear side of each submounted substrate 14. As the submounted substrate 14 reaches the end of the conveyor belt, the submounted substrate 14 is propelled onto the vacuum chuck 12 and the flexible protrusion continues pushing the submounted substrate 14 until the protrusion flexes back against the conveyor belt as it contacts the vacuum chuck 12. Alternatively, the flexible protrusion may be spring loaded such that the protrusion rotates fully until it is flat against the conveyor belt and springs back into position once it has completely bypassed the vacuum chuck 12.

As used herein, all the foregoing descriptions and embodiments with respect to the apparatus aspect are equally applicable to the following method, software, and system aspects as well. Furthermore, all embodiments disclosed for each aspect may be combined with other embodiments of that aspect, unless the context clearly dictates otherwise.

In a second aspect, the present invention may take the form of a method for debonding a submounted substrate 14 comprising: (a) mounting a submounted substrate 14 in a vacuum operated chuck 12 attached to an X-stage 10, wherein the submounted substrate 14 comprises a rigid carrier substrate bonded to a flexible substrate, wherein the X-stage 10 is moveably coupled to a Y-stage 16, (b) adjusting a debonder's height in a Z-axis such that the debonder 18 is aligned with an interface between the rigid carrier substrate and the flexible substrate, wherein the debonder 18 is coupled to the Y-stage 16, wherein the debonder 18 comprises two mounting blocks 20 and a cutting edge 22, wherein the two mounting blocks 20 each have a distal end 24 attached to the Y-stage 16 such that the X-stage 10 is capable of moving between the two mounting blocks 20, wherein the two mounting blocks 20 each have a proximal end 26 attached to an end of the cutting edge 22 such that the cutting edge 22 spans the X-stage 10, (c) bringing an upper plate with a vacuum-ring into contact with the flexible substrate, and (d) debonding the flexible substrate from the rigid carrier substrate such that the debonder 18 cuts through the interface between the rigid carrier substrate and the flexible substrate, wherein the vacuum-ring holds onto the flexible substrate via suction as the flexible substrate is debonded from the rigid carrier.

As used herein, the mounting step may be, but does not have to be, accomplished via the conveyor system described with respect to the apparatus aspect. Further, the conveyor system does not have to be coupled to the X-stage 10 to practice the method aspect or the following software and system aspects. The submounted substrate 14 may be loaded manually by hand or by any other method commonly known in the art.

As used herein, the upper plate's vacuum source does not have to be coupled to the X- or Y-stage 16 to practice the method aspect or the following software and system aspects. Instead, the upper plate and vacuum source can exist separate and apart from the debonder apparatus 18.

In one embodiment, the method may include heating the cutting edge 22 of the debonder 18 prior to debonding the flexible substrate from the rigid carrier. When the heated cutting edge 22 is brought into contact with the adhesive layer, the adhesive softens and is more pliable making it easier to debond the submounted substrate 14. Various embodiments for temperature controllers for heating the cutting edge 22 include, but are not limited to, those described above in the first aspect of the invention.

In one embodiment, the debonder 18 is capable of ultrasonic vibration. Such vibration of the debonder 18 further assists the cutting edge 22 in penetrating through the adhesive layer of the submounted substrate 14. Various embodiments for generating ultrasonic vibration of the debonder 18 include, but are not limited to, those described above in the first aspect of the invention.

In one embodiment, the method may include applying a solvent drip system to the interface between the rigid carrier substrate and the flexible substrate prior to and/or during the debonding step. The application of the solvent dissolves the adhesive layer at the perimeter of the submounted substrate 14 weakening the bond between the rigid carrier substrate and the flexible substrate making it easier for the cutting edge 22 to penetrate the adhesive layer. As used herein, the solvent drip system's solvent reservoir does not have to be coupled to the X- or Y-stage 10, 16 to practice the method aspect the following software and system aspects. Instead the solvent reservoir and entire solvent drip system can exist separate and apart from the debonder apparatus 18. Various embodiments of solvent drip systems include, but are not limited to, those described above in the first aspect of the invention.

In one embodiment, the method may include removing residual adhesive from the rigid carrier substrate via a cleaning system after debonding occurs. In another embodiment, the method may include removing residual adhesive from the flexible carrier substrate via a cleaning system after debonding occurs; this embodiment results in removing substantially all residual adhesive without inflicting damage on the substrates themselves. Various embodiments for removing residual adhesive include, but are not limited to, those described above in the first aspect of the invention.

As used herein, the rigid carrier substrate and flexible substrate's cleaning systems' solvent reservoirs do not have to be coupled to the X- or Y-Stage 10, 16 to practice the method aspect the following software and system aspects. Instead the solvent reservoirs and both cleaning systems can exist separate and apart from the debonder apparatus 18.

In one embodiment, the X-stage 10 and Y-stage 16 are motorized; in another embodiment, the Y-stage 16 moves relative to the X-stage 10; in a further embodiment, the Y-stage 16 rotates concentric to the X-stage 10. Each of these embodiments is discussed in more detail in the first aspect of the invention.

In one embodiment, the vacuum-operated chuck 12 has temperature control. As used herein, temperature control of the vacuum chuck 12 enables the surface of the chuck 12 to heat and then transfer the heat to the rigid carrier substrate and subsequently to the adhesive layer. Heating the adhesive layer in this manner makes the adhesive softer and easier to penetrate with the cutting edge 22. The temperature is of such a high degree as to act on the adhesive but not so high a degree that permanent damage is caused to either the rigid carrier substrate or the flexible substrate. In various embodiments, the debonding is carried out at a temperature between 40° C. and 200° C.

In one embodiment, the method further comprises replacing the debonder's cutting edge 22 via a reel-to-reel system after use in the debonding process.

As used herein, all the foregoing descriptions and embodiments with respect to the method aspect are equally applicable to the previous apparatus aspect, as well as to the following software and system aspects. In various embodiments, each embodiment of the methods of the invention may be carried out using any apparatus of any embodiment of the first aspect of the invention, or any system of any embodiment of the third aspect of the invention, described below.

In a third aspect, the present invention may take the form of a system for debonding a submounted substrate 14 comprising: (a) a user interface, (b) a conveyor system communicatively coupled to the user interface, wherein the conveyor system is operable to (i) transport a submounted substrate 14 a predetermined distance and (ii) load the submounted substrate 14 into a debonding apparatus, (c) a solvent drip system communicatively coupled to the user interface, wherein the solvent drip system is operable to apply a solvent drip to the submounted substrate 14, (d) a vibration system communicatively coupled to the user interface, wherein the vibration system is operable to vibrate a debonder 18 at ultrasonic frequencies, (e) a vacuum system communicatively coupled to the user interface, wherein the vacuum system is operable to stabilize the submounted substrate 14 against an upper plate via a vacuum-ring, (f) a debonding system communicatively coupled to the user interface, wherein the debonding system is operable to separate the submounted substrate 14 into a flexible substrate and a rigid carrier substrate, (g) a temperature control system communicatively coupled to the user interface, wherein the temperature control system is operable to heat the debonding system's cutting edge 22 and/or vacuum operated chuck 12 prior to debonding, (h) a reel-to-reel system, wherein the debonder 18 is capable of replacing a cutting edge 22 after use, and (i) a cleaning system communicatively coupled to the user interface, wherein the cleaning system is operable to remove residual adhesive from the rigid carrier substrate after debonding.

As used herein, transporting and loading a submounted substrate 14 is accomplished by the conveyor system as described with respect to the apparatus and method aspects.

As used herein, applying a solvent drip is accomplished by the solvent drip system described with respect to the apparatus and method aspects.

As used herein, the user interface may include one or more of a keyboard, a monitor, a control panel, and tools and output equipment for managing transporting, loading, applying solvent drip, heating, vibrations, stabilizing, debonding, and removing residual adhesive. These tools include various input equipment, such as sensors and trackers that monitor each function and provide real-time data to the user on the monitor or other display, who can then manage the system utilizing the output equipment coupled to the control panel and/or keyboard, all of which are integrated by a processing unit capable of automating the apparatuses, systems, and methods of the invention.

In operation, a plurality of the subsystems listed above may interact to accomplish debonding a submounted substrate 14. In one embodiment, one debonder 18 may feed two or more cleaning systems, one batch dip station to clean the rigid carrier and one high pressure solvent spray station to clean the flexible substrate. Depending on the speed of the debonding system, more than two cleaning systems may be necessary in order to operate the debonding system at an efficient speed for a manufacturing environment. In another embodiment, there may be one conveyor system coupled to two slides that feed two submounted substrates 14 to two debonding systems which in turn supply four or more cleaning stations. One of ordinary skill in the art will appreciate there are many ways to implement these systems with various pairings of each subsystem in order to, for example, optimize manufacturing capacity.

In a fourth aspect, the present invention may take the form of physical computer readable storage media for automatically carrying out the methods of the invention on an apparatus or system for debonding a submounted substrate 14. In this aspect, the physical computer readable storage media is capable of providing instructions stored in data storage and executable by a processor for causing a system for debonding a submounted substrate 14 to carry out any one or more of the methods or systems described herein. The physical computer readable storage media is capable of operating on a computer system to control the various embodiments of a system for debonding a submounted substrate 14.

As used herein the term "physical computer readable medium" includes magnetic disks, optical disks, organic memory, and any other volatile (e.g., Random Access Memory ("RAM")) or non-volatile (e.g., Read-Only Memory ("ROM")) mass storage system readable by the CPU. The physical computer readable medium includes cooperating or interconnected computer readable medium, which may exist exclusively on the processing system or may be distributed among multiple interconnected processing systems that may be local or remote to the processing system.

In one embodiment of the fourth aspect, the present invention may take the form of physical computer readable storage media providing instructions stored in data storage and executable by a processor for causing a system for debonding a submounted substrate 14 to carry out functions including: (a) transporting a submounted substrate 14 for a predetermined distance, (b) loading a submounted substrate 14 into a debonding apparatus; (c) applying a solvent drip to the submounted substrate 14, (d) heating a cutting edge 22 and/or a vacuum operated chuck 12, (e) vibrating a debonder 18 at ultrasonic frequencies, (f) stabilizing the submounted substrate 14 against an upper plate via a vacuum-ring, (g) debonding the submounted substrate 14, (h) replacing the debonder's cutting edge 22 via a reel-to-reel system, and (i) removing residual adhesive from the submounted substrate's rigid carrier substrate after debonding.

Note that any of the foregoing embodiments of any aspect may be combined together to practice the claimed invention, unless the context clearly dictates otherwise.

The invention claimed is:

1. An apparatus for debonding a submounted substrate comprising:
   an X-stage;
   a vacuum operated chuck attached to the X-stage, wherein the vacuum operated chuck is capable of receiving a submounted substrate;
   a Y-stage moveably coupled to the X-stage and oriented perpendicular to the X-stage; and
   a debonder coupled to the Y-stage, wherein the debonder comprises two mounting blocks and a cutting edge, wherein the two mounting blocks each have a distal end attached to the Y-stage such that the X-stage is capable of moving between the two mounting blocks, wherein the two mounting blocks each have a proximal end attached to an end of the cutting edge such that the cutting edge spans the X-stage, wherein the cutting edge is adjustable in height in a Z-axis.

2. The apparatus of claim 1, further comprising:
   an upper plate containing a vacuum-ring, wherein a vacuum source for the upper plate is coupled to the X- or Y-stage.

3. The apparatus of claim 1, further comprising:
   means for controlling temperature of the debonder's cutting edge.

4. The apparatus of claim 1, further comprising a temperature controller functionally coupled to the debonder cutting edge.

5. The apparatus of claim 1, further comprising:
   means for vibrating the debonder at ultrasonic frequencies.

6. The apparatus of claim 1, further comprising one or more transducer plates functionally coupled to the debonder.

7. The apparatus of claim 1, further comprising:
   means for applying a solvent to the submounted substrate, wherein the means for applying a solvent includes a solvent reservoir coupled to one or both of the X- or Y-stage.

8. The apparatus of claim 1, further comprising a solvent drip system coupled to one or both of the X- or Y-stage.

9. The apparatus of claim 1, further comprising:
   a cleaning system for removing residual adhesive from a rigid carrier substrate after debonding occurs, wherein the cleaning system includes a solvent reservoir coupled to one or both of the X- or Y-stage.

10. The apparatus of claim 9, wherein the cleaning system for removing residual adhesive from a rigid carrier comprises means for a batch dip in solvent.

11. The apparatus of claim 1, further comprising:
    a cleaning system for removing residual adhesive from a flexible substrate after debonding occurs, wherein the cleaning system includes a solvent reservoir coupled to one or both of the X- or Y-stage.

12. The apparatus of claim 11, wherein the cleaning system for removing residual adhesive from a flexible substrate comprises a high pressure solvent spray.

13. The apparatus of claim 1, wherein the X-stage and Y-stage are motorized.

14. The apparatus of claim 13, wherein the Y-stage is capable of rotational movement concentric to the X stage.

15. The apparatus of claim 1, wherein the Y-stage is capable of movement.

16. The apparatus of claim 1, further comprising:
    a conveyor system for loading a submounted substrate into the vacuum operated chuck, wherein the conveyor system is coupled to the X-stage.

17. The apparatus of claim 1, further comprising a reel-to-reel system coupled to the two mounting blocks.

18. A method for debonding a submounted substrate comprising:
    mounting a submounted substrate in a vacuum operated chuck attached to an X-stage, wherein the submounted substrate comprises a rigid carrier substrate bonded to a flexible substrate, wherein the X-stage is moveably coupled to a Y-stage;
    adjusting a debonder's height in a Z-axis such that the debonder is aligned with an interface between the rigid carrier substrate and the flexible substrate, wherein the debonder is coupled to the Y-stage, wherein the debonder comprises two mounting blocks and a cutting edge, wherein the two mounting blocks each have a distal end attached to the Y-stage such that the X-stage is capable of moving between the two mounting blocks, wherein the two mounting blocks each have a proximal end attached to an end of the cutting edge such that the cutting edge spans the X stage;
    bringing an upper plate comprising a vacuum-ring into contact with the flexible substrate; and
    debonding the flexible substrate from the rigid carrier substrate such that the debonder cuts through the interface between the rigid carrier substrate and the flexible substrate, wherein the vacuum-ring holds onto the flexible substrate via suction as the flexible substrate is debonded from the rigid carrier.

19. The method of claim 18 further comprising:
    heating the cutting edge of the debonder prior to debonding the flexible substrate from the rigid carrier.

20. The method of claim 18, wherein the debonder is capable of ultrasonic vibration.

21. The method of claim 18, further comprising:
    applying a solvent drip system to the interface between the rigid carrier substrate and the flexible substrate prior to and/or during the debonding step.

22. The method of claim 18, further comprising:
    removing residual adhesive from the rigid carrier substrate via a cleaning system after debonding occurs.

23. The method of claim 18, further comprising:
    removing residual adhesive from the flexible substrate via a cleaning system after debonding occurs.

24. The method of claim 18, wherein the X-stage and Y-stage are motorized.

25. The method of claim 18, wherein the Y-stage moves relative to the X-stage.

26. The method of claim 18, wherein the Y-stage rotates concentric to the X-stage.

27. The method of claim 18, wherein the vacuum-operated chuck has temperature control.

28. The method of claim 18, further comprising:
    replacing the debonder's cutting edge via a reel-to-reel system after use in the debonding process.

29. Physical computer readable storage media providing instructions stored in data storage and executable by a processor for causing a system for debonding a submounted substrate to carry out the method in claim 18.

* * * * *